United States Patent Office 2,725,371
Patented Nov. 29, 1955

2,725,371

CYANOPROPENE PHOSPHONAMIDES AND POLYMERS THEREOF

Harry W. Coover, Jr., and Joseph B. Dickey, Kingsport, Tenn., assignors to Eastman Kodak Company, Rochester, N. Y., a corporation of New Jersey No Drawing. Application April 24, 1953,
Serial No. 351,044

14 Claims. (Cl. 260—85.5)

This invention relates to a new class of phosphonamides and more particularly to cyanopropenephosphonamides, to polymers thereof, and to their methods of preparation.

The new monomeric compounds of our invention are represented by the following general formulas:

I 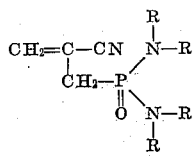

and

II 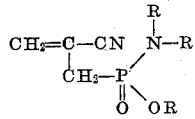

wherein each R represents an atom of hydrogen, an alkyl group containing from 1 to 4 carbon atoms (e. g. methyl, ethyl, propyl, isopropyl, butyl, isobutyl, etc. groups) or a phenyl group. They are useful for preparing various derivatives thereof, and more especially useful for preparing resinous homopolymers and interpolymers with themselves or with one or more other polymerizable, monoethylenically unsaturated compounds, which polymers exhibit many valuable properties, such as high flame-resistance, toughness, good solubility in various volitile organic solvents, and from which can be prepared excellent quality fibers for textile purposes and molding compositions giving shaped objects of good stability.

It is, accordingly, an object of the invention to provide a new class of unsaturated phosphonamides containing nitrile groups, and polymers thereof. Another object is to provide shaped objects of the new polymers, such as fibers, molded objects, films, sheet materials, etc. Another object is to provide methods for preparing the new monomers and polymers thereof. Other objects will become apparent hereinafter.

In accordance with the invention, we prepare our compounds represented by the above Formula I by reacting an α-halomethyl acrylonitrile, e. g. α-chloromethyl acrylonitrile, with an akyl-diamidophosphite such as an alkyl-N,N'-dialkylamidophosphite, or an alkyl-N,N,N',N'-tetraalkylamidophosphite, or a phenyl-N,N'-dialkyl-amidophosphite, or a phenyl N,N,N',N'-tetraalkylamido-phosphite, etc., in the presence of a polymerization inhibitor such as hydroquinone, and separating the product by distillation of the reaction mixture. The reaction is represented by the following equation:

III 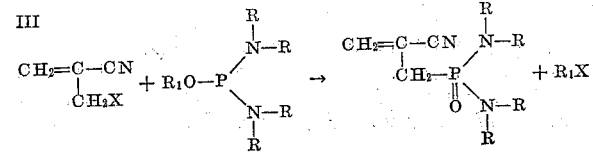

wherein X represents a halogen atom such as chlorine, or bromine, R is as previously defined, and $R_1$ represents an alkyl group containing from 1 to 4 carbon atoms. Suitable alkyl-, diamidophosphites include methyl-, ethyl-, propyl- or butyl-diamidophosphites, methyl-, ethyl-, propyl- or butyl-N,N'-dimethyldiamidophosphites and corresponding alkyl-N,N'-diethyldiamidophosphites, alkyl-N,N'-dipropyldiamidophosphites and alkyl-N,N'-dibutyldiamidophosphites, methyl-, ethyl-, propyl- or butyl-N,N,N',N' - tetramethyldiamidophosphites and corresponding alkyl - N,N,N',N'-tetraethyldiamidophosphites, alkyl - N,N,N',N' - tetrapropyldiamidophosphite, alkyl-N,N,N',N' - tetrabutyldiamidophosphites, etc. Suitable phenyl-diamidophosphites include phenyl-diamido-phosphite, phenyl-N,N'-dimethylamidophosphite, phenyl-N,N,N',N'-tetramethylamidophosphite, and the like. The proportions of the reactants employed can be varied to some extent, but preferably approximately equal molecular proportions of the α-halomethyl acrylonitrile and the desired amidophosphite are used to give the best results. The temperature of the reaction is not critical but generally the temperature is raised slowly at the start of the reaction until substantially all of the relatively low boiling alkyl halide by-product is evolved and distilled over, after which the distillation is continued under reduced pressure and the fractionated product collected as the distillate. The lower temperature limit of the reaction is about 0° C., while the upper limit depends upon the boiling point of the product which may be 150°–200° C. or more, depending on the amount of vacuum applied in the final distillation step.

We prepare the new compounds represented by the above Formula II by reacting an α-halomethylamido acrylonitrile with a dialkyl alkylaminophosphite or with a diaryl alkylaminophosphite, in the presence of a polymerization catalyst such as hydroquinone, and separating the product by distillation of the reaction mixture. The reaction is represented by the following equation:

IV $$CH_2=C-CN \atop CH_2X + {R_2O \atop R_2O} P-N{R \atop R} \rightarrow CH_2=C-CN \atop CH_2-P{N-R \atop \|\ OR_2} + R_2X$$

wherein X and R are as previously defined and $R_2$ represents an alkyl group containing from 1 to 4 carbon atoms and a phenyl group. Suitable dialkyl- or diaryl-alkyl-aminophosphites for use in the above reaction include dimethyl-, diethyl-, dipropyl-, dibutyl-, diphenyl-, ditolyl-methylaminophosphites, and corresponding dialkyl or diphenyl ethylaminophosphites, dialkyl or diphenyl propyl-aminophosphites, dialkyl or diphenyl butylaminophosphites, dimethyl-, diethyl-, dipropyl-, dibutyl-, diphenyl-, ditolyl-N,N-dimethylaminophosphites and corresponding dialkyl or diphenyl N,N-diethylaminophosphites, dialkyl or diphenyl N,N-di-n-butylaminophosphites, and the like. The proportions of reactants and the temperature conditions here are about the same as those set forth in the preceding for preparing those of our compounds represented by Formula I.

The polymerization of the new compounds of the invention alone or conjointly with each other or with one or more monoethylenically unsaturated, polymerizable compounds containing a

V         $—CH=C<$ group, or more especially a

VI         $CH_2=C<$ group can be carried out in mass, solution or emulsion processes, and advantageously in the presence of a polymerization catalyst. Heat or actinic light can also be used to accelerate the polymerization reaction. Peroxide polymerization catalysts which are soluble in the monomers or in solvent mediums for the polymerization can be employed, e. g., organic peroxides such as benzoyl peroxide, acetyl peroxide, lauryl peroxide, tertiary butyl hydroperoxide, urea peroxide, triacetone peroxide, hydrogen peroxide, perborates e. g., alkali metal perborates such as sodium and potassium perborates, ammonium perborate, etc., persulfates e. g., alkali metal persulfates such as sodium and potassium persulfates, ammonium persulfate, etc. Other catalysts as boron trifluoride, and azines, ketazines, etc. can also be used. Mixtures of catalysts can be employed. The amount of such catalyst can be varied, but advantageously from about 0.01 to 1.0 percent or even more, based on the weight of the monomer to be polymerized. If desired, reducing agents such as alkali metal bisulfites (e. g. sodium, potassium, etc. bisulfites) can be added in similarly small amount as the peroxide catalyst to reduce the time required for the polymerization to be effected. Chain regulators such as hexyl, cetyl, lauryl, myristyl mercaptans, etc. can also be used to advantage. The temperature at which polymerization can be carried out with advantage is from about 20° to 125° C. Pressures above or below atmospheric can be employed.

For emulsion polymerizations any non-solvent for the monomer or mixtures of monomers, where an interpolymer is prepared, can be employed, water being especially advantageous. In the latter kind of medium, the monomer or mixtures of monomers can be advantageously emulsified in the water using emulsifying agents such as alkali metal salts of certain alkyl acid sulfates, e. g., sodium lauryl sulfate, potassium lauryl sulfate, etc., alkali metal salts of aromatic sulfonic acids (sodium isobutylnaphthalene sulfonate), alkali metal or amine addition salts of sulfosuccinic acid esters, alkali metal salts of fatty acids containing 12 to 20 carbon atoms e. g. sodium or potassium stearate, palmitate, etc., sulfonated fatty acid amides, alkali metal salts of alkane sulfonic acids, sulfonated ethers, e. g., aryloxy polyalkylene ether sulfonates, etc. Mixtures of emulsifying agents can be used. Where a relatively poor dispersing agent is required, as in bead or granular polymerizations, starch, methylated starch, gum arabic, polyvinyl alcohol, partially hydrolyzed polyvinyl acetate gelatin, sodium glycolate, etc. can be employed with advantage. The polymerizations wherein the monomer is dispersed in a non-solvent can be facilitated by stirring, shaking, tumbling, and the like.

The copolymers can be prepared by the described polymerization procedures. Any proportions of one or more of the cyanopropene phosphonamides of the invention can be employed with any proportions of one or more other monoethylenically unsaturated, polymerizable compounds, but preferably from 5 to 95 parts by weight of the cyanopropene phosphonamides of the invention and from 95 to 5 parts by weight of the other polymerizable compound or compounds. Suitable monoethylically unsaturated, polymerizable compounds containing a —CH=C< group, or more especially a CH₂=C< group include vinyl carboxylic acid esters such as vinyl acetate, vinyl propionate, vinyl trifluoroacetate, vinyl benzoate, etc., alkyl esters of acrylic and methacrylic acids such as methyl acrylate, ethyl acrylate, butyl acrylate, methylmethacrylate, unsaturated nitriles such as acrylonitrile, methacrylonitrile, ethacrylonitrile, etc., vinyl hydrocarbons such as styrene, α-methylstyrene, isobutylene, ethylene, etc., vinyl chloride, vinylidene chloride, vinyl fluoride, isopropenyl acetate, allyl acetate, methallyl acetate, vinyl ethers, vinyl sulfonamides, vinyl urethanes, and the like. The copolymers obtained have been found to contain approximately the same proportions of constituents as were present in the starting polymerization mixtures.

The following examples will serve further to illustrate the cyanopropenephosphonamides, polymers thereof, and the manner of preparing the same.

*Example 1*

A solution of 10.2 g. (0.1 mol.) of α-chloromethyl acrylonitrile, 22.0 g. (0.1 mol.) of ethyl N,N,N′,N′-tetraethyldiamidophosphite and 0.1 g. of hydroquinone, was distilled slowly through a 10-inch column. Ethyl chloride was evolved. When the reaction was complete, the residual reaction mixture was distilled under reduced pressure to give a good yield of colorless liquid product having a B. P. 162°–165° C./0.7 mm. pressure, identified as the compound, N,N,N′,N′-tetraethyl 2-cyanopropene-3-phosphondiamine, and having the structural formula:

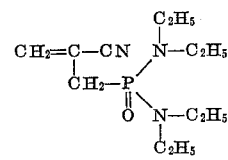

The above process can also be carried in a continuous manner of operation, for example, by continually adding the reagents to the still column and bleeding off the products of reaction.

*Example 2*

A solution of 10.2 g. (0.1 mol.) of α-chloromethylacrylonitrile, 27.6 g. (0.1 mol.) of ethyl N,N,N′,N′-tetra-n-propyldiamidophosphite and 0.1 g. of hydroquinone was reacted and distilled following the procedure of Example 1. A good yield of a liquid B. P. 189°–193° C./0.7 mm. pressure was obtained and was identified as N,N,N′,N′-tetra-n-propyl 2-cyanopropene-3-phosphondiamide having the structural formula:

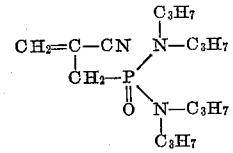

*Example 3*

A solution of 10.2 g. (0.1 mol.) of α-chloromethylacrylonitrile, 13.4 g. (0.1 mol.) of ethyl N,N,-dimethyldiamidophosphite and 0.1 g. of hydroquinone was reacted and distilled following the procedure of Example 1. A good yield of a liquid B. P. 171°–174° C./0.7 mm. pressure was obtained and was identified as N,N′-dimethyl 2-cyanopropene-3-phosphondiamide having the structural formula:

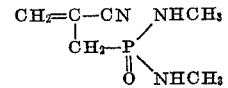

*Example 4*

10 g. of N,N,N′,N′-tetraethyl 2-cyanopropene-3-phosphondiamide and 0.03 g. of benzoyl peroxide were heated at 100° C., in a sealed glass tube, until the monomer had all polymerized to a clear, hard moldable resin.

In place of the N,N,N′,N′-tetraethyl 2-cyanopropene-3-phosphondiamide, there can be substituted in the above example a like amount of N,N,N′,N′-tetra-n-propyl 2-cyanopropene-3-phosphondiamide or N,N,N′,N′-tetra-n-butyl 2-cyanopropene-3-phosphondiamide or any of the other of the mentioned related compounds to give generally similar homopolymeric resins.

*Example 5*

10 g. of N,N′-dimethyl 2-cyanopropene-3-phosphondiamide and 0.03 g. of benzoyl peroxide were heated at 100° C., in a sealed tube, under a nitrogen atmosphere, until all of the monomer had homopolymerized to a clear, hard moldable resin showing considerable resistance to burning.

Generally similar kinds of resins are also obtained by substituting for the monomer in the above example a like amount of related compounds such as N,N'-diethyl 2-cyanopropene-3-phosphondiamide, N,N'-di-n-propyl 2-cyanopropene-3-phosphondiamide, N,N'-di-n-butyl 2-cyanopropene-3-phosphondiamide, and the like compounds.

Example 6

0.5 g. of N,N'-dimethyl 2-cyanopropene-3-phosphondiamide, 9.5 g. of acrylonitrile, 0.2 g. of ammonium persulfate, 0.2 g. of sodium bisulfite and 2.0 g. of potassium laurate were added to 100 cc. of distilled water. Polymerization began immediately and was complete within 8 hours. The polymer precipitated from solution as it formed and was isolated by filtration of the reaction mixture, washed with water and dried. It contained in combination approximately 5 percent by weight of N,N'-dimethyl 2-cyanopropene-3-phosphondiamide and approximately 95 percent by weight of acrylonitrile. It was soluble in dimethylformamide. Fibers spun from this resinous copolymer had good tensile strength and elongation, would not support combustion and had a softening point higher than 210° C.

Example 7

7.5 g. of N,N,N',N'-tetra-n-propyl 2-cyanopropene-3-phosphondiamide, 2.5 g. of methyl acrylate and 0.3 g. of benzoyl peroxide were placed in a sealed tube and heated at 80° C. for a period of 24 hours. A clear, hard, moldable, copolymeric resin containing in combination approximately 75 percent by weight of N,N,N',N'-tetra-n-propyl 2-cyanopropene-3-phosphondiamide and 25 percent by weight of methyl acrylate was obtained. It showed considerable fire-resistance.

Example 8

6.0 g. of N,N'-dimethyl 2-cyanopropene-3-phosphondiamide, 4.0 g. of styrene and 0.3 g. of N,N'-azo-bisisobutyronitrile were heated in a sealed tube at 80° C. for a period of 36 hours. A clear, hard moldable, fire-resistant, copolymeric resin containing in combination approximately 60 percent by weight of N,N'-dimethyl 2-cyanopropene-3-phosphondiamide and 40 percent by weight of styrene was obtained. It was soluble in dimethyl formamide.

Example 9

A mixture of 10.2 g. (0.1 mol.) of α-chloromethylacrylonitrile, 15.1 g. (0.1 mol.) of diethylmethylaminophosphite (prepared by reacting diethylchlorophosphite with two equivalents of methylamine) and 0.1 g. of hydroquinone was distilled slowly through a 10-inch column. Ethyl chloride was evolved. When the reaction was complete, the residual reaction mixture was distilled under reduced pressure to give a good yield of a colorless liquid having a B. P. 151°–154° C./0.7 mm. pressure, identified as the compound ethyl N-methylamido-2-cyanopropene-3-phosphonate, and having the structural formula:

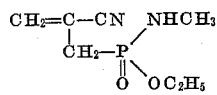

Example 10

A mixture of 10.2 g. (0.1 mol.) of α-chloromethylacrylonitrile, 24.9 g. (0.1 mol.) of di-n-butyl N,N-diethylaminophosphite (prepared by reacting di-n-butylchlorophosphite with two equivalents of diethylamine) and 0.1 g. of hydroquinone was reacted and distilled according to the procedure of Example 8. In this case, butyl chloride was evolved as a by-product. A good yield of a colorless liquid B. P. 165°–168° C./1 mm. pressure was obtained and was identified as n-butyl N,N-diethylamido-2-cyanopropene-3-phosphonate having the structural formula:

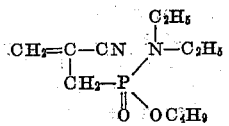

Example 11

A mixture of 10.2 g. (0.1 mol.) of α-chloromethylacrylonitrile, 28.9 g. (0.1 mol.) of diphenyl N,N-diethylaminophosphite (prepared by reacting diphenylchlorophosphite with two equivalents of diethylamine) and 0.1 g. of hydroquinone was reacted and distilled according to the procedure of Example 8. In this case phenyl chloride was evolved as a by-product. A good yield of a colorless liquid B. P. 164°–168° C./0.1 mm. pressure was obtained and was identified as phenyl N,N-diethylamido-2-cyanopropene-3-phosphonate having the general formula:

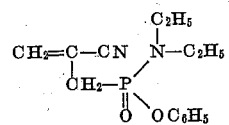

Example 12

10 g. of ethyl N-methylamido-2-cyanopropene-3-phosphonate and 0.03 g. of benzoyl peroxide were heated at 80° C., in a sealed tube, for a period of 24 hours. A clear, hard, moldable resin was obtained.

Example 13

10 g. of n-butyl N,N-dimethylamido-2-cyanopropene-3-phosphonate and 0.3 g. of N,N'-azo-bisisobutyronitrile were heated at 90° C., until the monomer was all polymerized. A clear, hard moldable resin was obtained which showed considerable fire-resistance.

Example 14

10 g. of phenyl N,N-diethylamido-2-cyanopropene-3-phosphonate and 0.03 g. of benzoyl peroxide were heated in a sealed tube at 90° C. for a period of 48 hours. A clear, hard moldable homopolymer was obtained.

Example 15

A mixture of 7.0 g. of ethyl N-methylamido-2-cyanopropene-3-phosphonate, 3.0 g. of methyl methacrylate and 0.03 g. of benzoyl peroxide was heated in a sealed glass tube at 80° C. for a period of 36 hours. A clear, hard, moldable copolymeric resin was obtained which contained approximately 70 percent by weight of the above phosphonate and approximately 30 percent by weight of methyl methacrylate.

Example 16

A mixture of 9.5 g. of n-butyl N,N-diethylamido-2-cyanopropene-3-phosphonate, 0.5 g. of vinyl acetate and 0.3 g. of benzoyl peroxide was heated at 100° C. for a period of 36 hours. A clear, hard moldable copolymer resin resulted. It contained approximately 95 percent by weight of the above phosphonate and approximately 5 percent by weight of vinyl acetate.

Example 17

A mixture of 7.0 g. of phenyl N,N-dimethylamido-2-cyanopropene-3-phosphonate, 3.0 g. of styrene and 0.2 g. of benzoyl peroxide was heated at 90° C. for a period of 48 hours. A clear, hard moldable resin was obtained which contained approximately 70 percent by weight of the above phosphonate and approximately 30 percent by weight of styrene.

By proceeding as set forth in the above examples, others of the mentioned monomers can be homopolymerized or copolymerized by batch or continuous processes to give similar clear, hard moldable resinous materials. If desired, other materials can be added such as dyes, pigments, fillers, plasticizers, etc. to give molding compositions for particular uses. As previously mentioned some of our new polymers are also especially useful for preparing fibers and filaments for textile purposes. The polymers of the invention are soluble in various volatile organic solvents such as acetone, methyl ethyl ketone, cyclohexanone, acetonitrile, dimethyl acetamide, dimethyl formamide, etc.

The solutions of the polymers in one or more of the above listed solvents can be coated on a smooth surface to give flexible, tough films or sheets which are useful for wrapping purposes, photographic film support, etc., or they can be spun to fiber by the wet or dry spinning processes. Dyes, pigments, fillers, plasticizers, etc. can also be incorporated in such solutions.

What we claim is:

1. A cyanopropene phosphonamide compound selected from the group consisting of compounds having the general formulas:

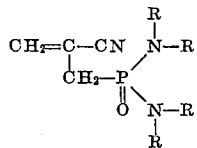

and

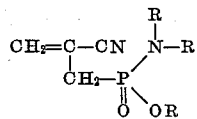

wherein R represents a member selected from the group consisting of at atom of hydrogen, an unsubstituted alkyl radical containing from 1 to 4 carbon atoms and an unsubstituted phenyl radical.

2. A cyanopropene phosphonamide having the general formula:

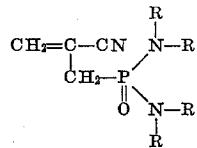

wherein R represents a member selected from the group consisting of an atom of hydrogen, an unsubstituted alkyl radical containing from 1 to 4 carbon atoms and an unsubstituted phenyl radical.

3. N,N'-dimethyl 2-cyanopropene-3-phosphondiamide.

4. N,N,N',N'-tetraethyl 2-cyanopropene-3 - phosphondiamide.

5. N,N,N',N'-tetra-n-propyl 2-cyanopropene-3 - phosphondiamide.

6. Ethyl N-methylamido-2-cyanopropene-3 - phosphonate.

7. Phenyl N,N-diethylamido-2-cyanopropene-3 - phosphonate.

8. A polymer of a cyanopropene phosphonamide selected from the group consisting of compounds having the general formulas:

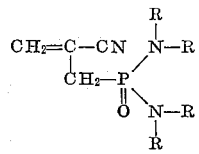

and

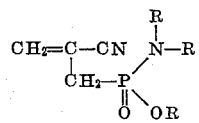

wherein R represents a member selected from the group consisting of an atom of hydrogen, an unsubstituted alkyl radical containing from 1 to 4 carbon atoms and an unsubstituted phenyl radical.

9. A polymer of a cyanopropene phosphonamide having the general formula:

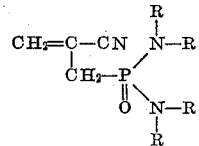

wherein R represents a member selected from the group consisting of an atom of hydrogen, an unsubstituted alkyl radical containing from 1 to 4 carbon atoms and an unsubstituted phenyl radical.

10. A copolymer of N,N'-dimethyl 2-cyanopropene-3-phosphondiamide and acrylonitrile.

11. A copolymer of N,N,N',-tetraethyl 2-cyanopropene-3-phonphondiamide and vinyl acetate.

12. A copolymer of N,N,N',N'-tetra-n-propyl 2-cyanopropene-3-phosphondiamide and methyl acrylate.

13. A copolymer of ethyl N-methylamido-2-cyanopropene-3-phosphonate and methyl methacrylate.

14. A copolymer of phenyl N,N-dimethylamido-2-cyanopropene-3-phosphondiamide and styrene.

No references cited.